INVENTORS
EDWARD S. DONN
RONALD L. KNAUBER
BY Richard W. Hauser
ATTORNEY

DIGITAL SURVEILLANCE SYSTEM

INVENTORS
EDWARD S. DONN
RONALD L. KNAUBER
BY
Richardson Hauser
ATTORNEY

INVENTORS
EDWARD S. DONN
RONALD L. KNAUBER
BY
Richard Hauser
ATTORNEY

INVENTORS
EDWARD S. DONN
RONALD L. KNAUBER
BY Richard W. Hanes
ATTORNEY 3,718,925
DIGITAL SURVEILLANCE SYSTEM Edward S. Donn, 1222 Chambers Drive, and Ronald L. Knauber, 1331 N. 31st St., both of Colorado Springs, Colo. 80904

Filed Dec. 28, 1970, Ser. No. 101,505
Int. Cl. G08b 25/00
U.S. Cl. 340—413 13 Claims

ABSTRACT OF THE DISCLOSURE

The present invention relates to electronic surveillance systems of the type having a central monitor station connected by a communications link to a plurality of remotely disposed transmitters, each of which receives digital information inputs through a short communications link from a plurality of interrogated points of interest. The system of the present invention includes means for temporarily terminating the scan of remote stations at such time as an alarm signal is detected from any point of interest and to utilize the communications links to convey analog information from the point of interest in alarm to the central monitoring station.

Surveillance systems of the general type here involved are usually employed for security purposes, such as for the detection of broken windows, opened doors, unusual sounds, heat or smoke. Such systems can also be advantageously used to monitor industrial equipment variables such as pressure, temperature or volume. Prior art monitoring devices in these fields have been confined primarily to binary signaling of a "go" or "no-go" type of information without the ability to communicate details of an alarm condition when one is detected. For example, it has been impractical, under the conditions of the prior art, to easily and economically provide a system at the location of a single remote subscriber which can identify a discrete number of different conditions such as fire, burglary, medical emergency, flooding, power failure and the like.

Thus, it is the primary purpose of the present invention to provide apparatus for rapid sequential scanning of a large number of points of interest, and to display at a central monitor station information relative to the kind and quality of the alarm condition, including analog information and to stop and again restart the scan of remote stations when sufficient information has been obtained from the point in alarm.

Another primary purpose of the invention is to provide a surveillance system for a large plurality of remote points of interest which operates with a combination of frequency division multiplexing and time multiplexing for matching available information to the communications channel capacity, that is, to allow the extraction and display of refined and detailed information from a particular point when that information becomes available and is of urgent character.

With respect to use of the system as a burglar alarm it is one objective of the invention to provide digital information by means of electrical current ratios which are established by nonlinear resistance elements whose resistance is a variable function of current, thus making it impossible to monitor the nominal resistance and duplicate it in order to defeat the system.

In addition, it is a purpose of this invention to allow connection of a plurality of remote monitored subscribers to a central monitor station via a single communications link.

A further object of the invention is to provide in a surveillance system means for multi-level signalling as opposed to simple binary signalling. Such a feature allows one communication channel to convey many different alarm conditions from a single remote point of interest and enhances the alarm information available at the monitoring system.

Other and still further objects, features and advantages of the present invention will become apparent upon a reading of the following detailed description of a preferred form of the invention taken in conjunction with the accompanying drawings in which.

Figure 1:
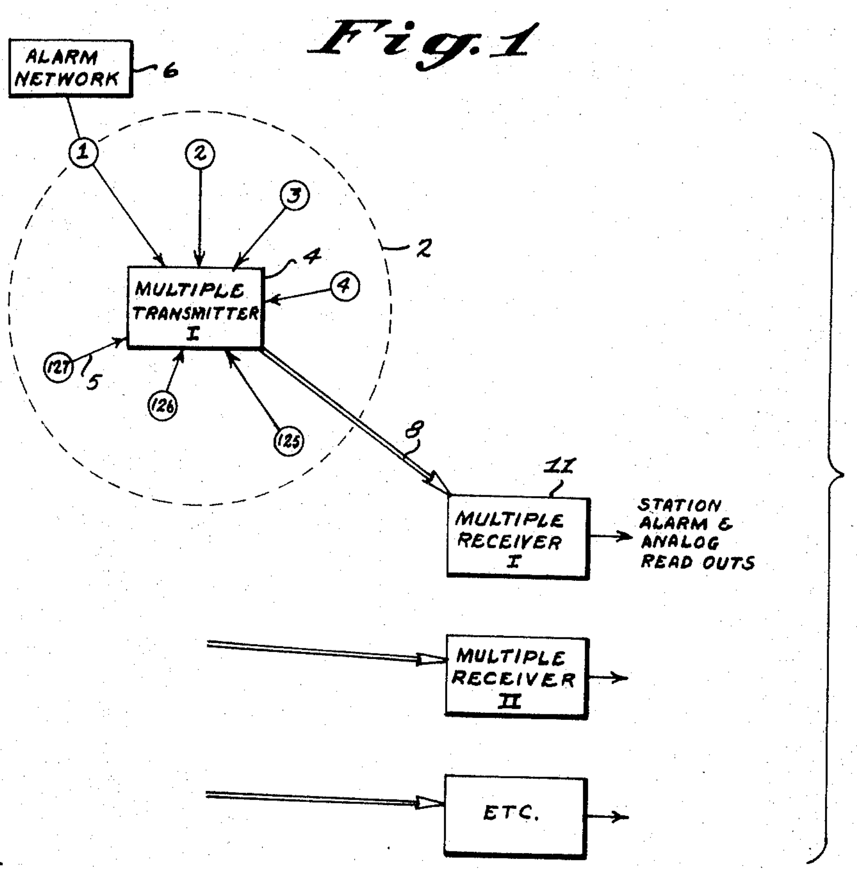
FIG. 1 is an over-all diagrammatic view of the surveillance system of the present invention.
Figure 4:
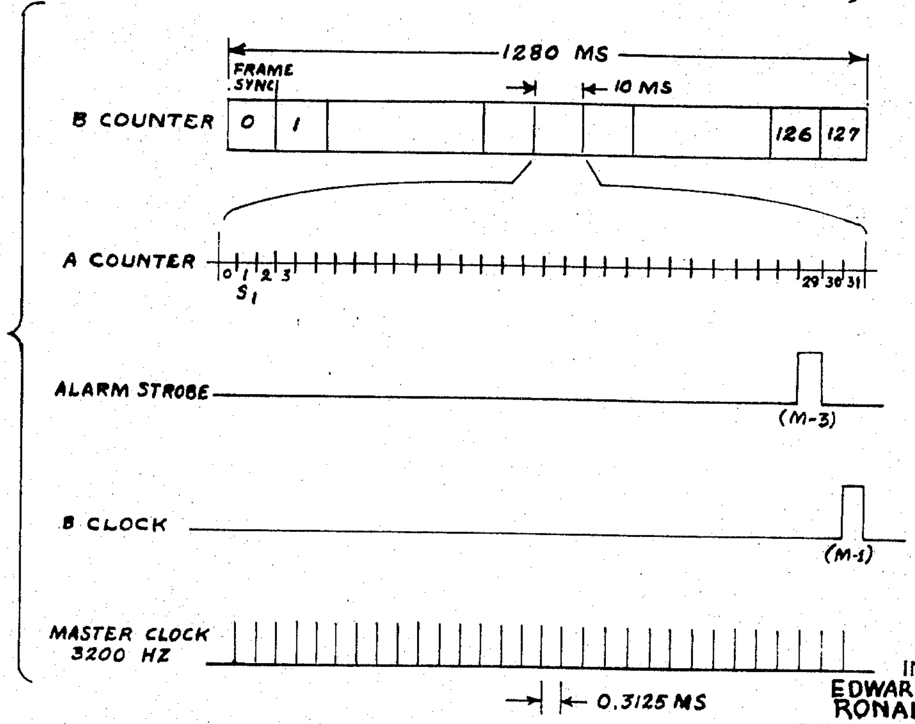
FIG. 4 is a timing diagram of the clock pulses and counter outputs of the transmitter.

The basic philosophy of the system of the present invention is shown in FIG. 1 where a typical geographically centralized area, such as a shopping center, is diagrammatically illustrated with the dashed circular line 2. Within this area is a multiplex transmitter 4 which is connected through relatively short communication channels 5 to the remote stations to be monitored (indicated by numerals within a circle and intended to represent from one to one-hundred twenty-seven different remote stations). Each of the remote stations is provided with its own alarm network 6 (shown typically in FIG. 1 as being part of the first remote station), which may include means for indicating from one to ten different discrete types of alarm conditions.

A long communication channel 8 interconnects the output of the multiplex transmitter 4 with the input of a multiplex receiver 11 which decodes and demodulates the received information and converts it into station addresses and alarms, if any, for the display or readout apparatus at the central monitoring station. For each area transmitter there is a corresponding multiplex receiver and display at the central monitoring station. By utilizing a modified form of time multiplexing, the large number of remote stations are made to share the long communications channel 8 during normal scanning since only a small portion of the channel bandwidths is allocated to each remote station. If no information is being transmitted bya remote station, the small bandwidth allocation helps reduce receiver noise input, thus increasing the accuracy of the monitoring process and increasing the effective number of stations which can be monitored.

Once the alarm is received, the time multiplexing mode of operation is synchronously stopped in the transmitter and receiver and the entire channel bandwidth is made available for audio or video signals to flow from the remote station, the low frequency range being used to transmit information identifying the general type of alarm and the higher frequencies being used to accommodate more detailed analog information such as video and sound signals. When sufficient information has been received, the operator clears the receiver and transmitter and the system synchronously reverts to the low bandwidth time multiplex mode of operation. More than one receiver may be monitored at any given central monitoring station.

Figure 2:
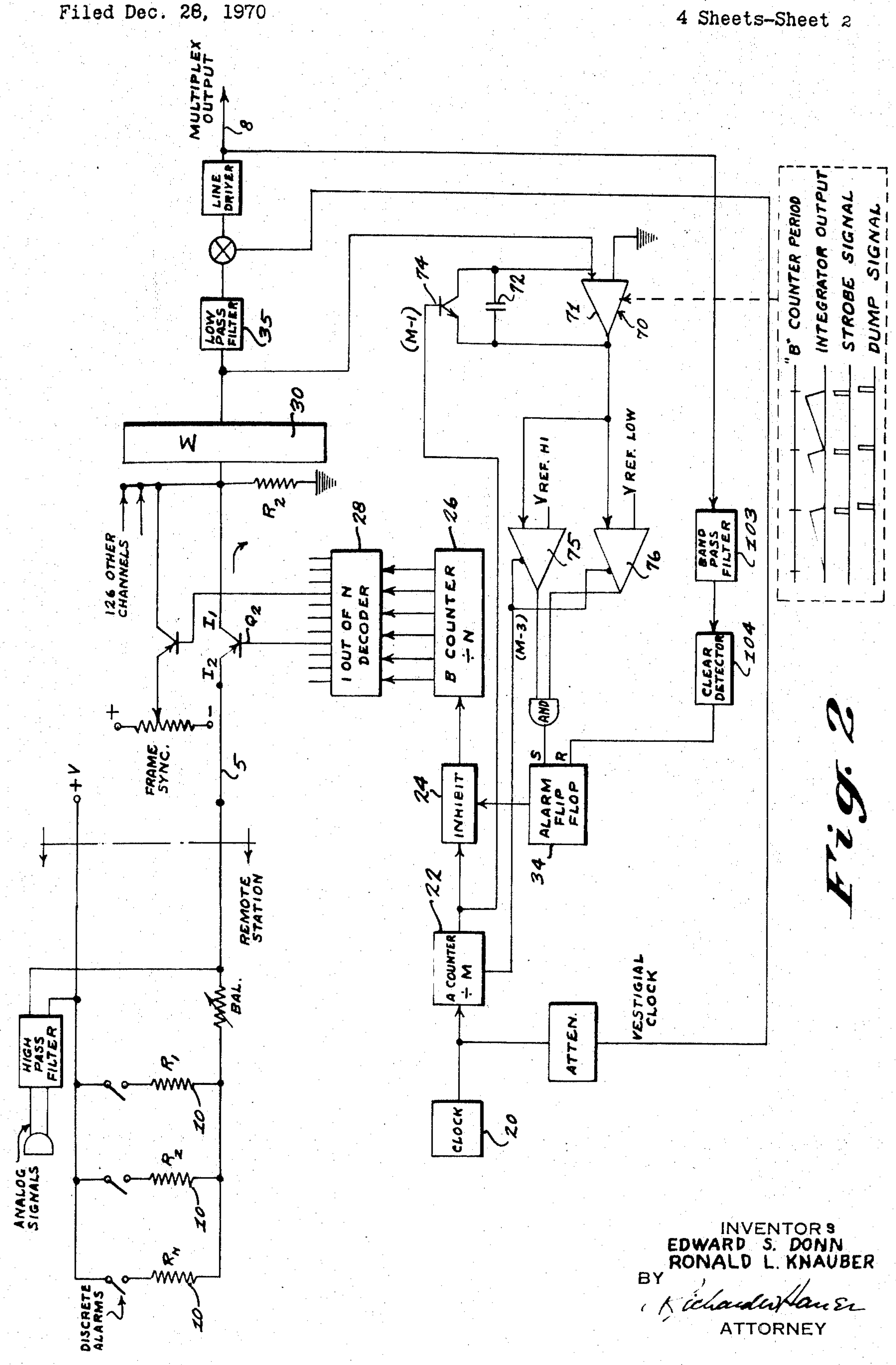
FIG. 2 is a block diagram of the multiplex transmitter.

Operation of the time multiplex aspect of the normal scanning mode can best be understood by reference to the transmitter diagram of FIG. 2. Discrete alarms are signalled to the multiplex transmitter 4 by means of electronic current ratios. A switching or alarm network 6 at the remote location causes various currents to flow in the circuit, according to some prearranged value, when the network is interrogated by the multiplex transmitter. The particular current levels for the several discrete alarm circuits 10 are established by a nonlinear resistance network which would be most difficult for an intruder to measure or imitate. Such nonlinear networks and elements are well covered in prior art but, as an example, could comprise diodes, breakdown diodes, field effect transistors or combinations of these elements and linear resistors.

A "no-alarm" condition is signalled by the nomial alarm circuit current determined by $R_1$ (I) plus the communication channel 5 resistance. The channel resistance is adjusted to a desired value by the balance potentiometer 12 in series with the communication leg 5. An open or shorted wire is a separate alarm which is signalled by zero or maximum current, respectively. Between zero and maximum current, other discrete alarms may be provided for by the nonlinear resistance elements consisting of $R_2$, $R_3$ . . . $R_n$. The specific number of alarms which can be distinguished at the receiver will only be limited by the signal-to-noise ratio of the communication channel in a band-width equal to the clock rate. A typical number of alarm levels might be five to ten.

The communications channel 8 between the transmitter 4 and the receiver 11 is time shared amongst the various monitored remote stations by means of an electronic decoder 28 which is analogous to a multiple positon mechanical switch or commutator. The switch "rotates" continuously in order to scan the various remote stations for an alarm. One of the positions of the switch is reserved for a frame synchronization indicator which is necessary for synchronizing the receiver and the transmitter. The decoder 28 is controlled by digital counting means whose basic timing pulses are derived from an oscillator or master clock 20. The clock output of 3200 hertz per second is attenuated and summed with the decoder 28 output for use in the receiver 11 but for use in the transmitter the same clock output is divided by a digital A counter 22 into M states (where M=32 in the present example). The A counter 22 state (M−1) is used to drive a second, or B, counter 26 which operates to divide the output of the B counter 26 into N states which correspond to the N possible "positions" or outputs of the decored (where N=128 in the present example).

In FIG. 2 the decoder 28 is shown is connection with a typical subscriber or remote station network 6, however, it is to be understood that a complete diagram of a transmitter 4 having 127 remote station networks 6 would also include 127 connections to the decoder.

The 10 millisecond gating pulses from the B counter 26 are successively directed by the decoder to each of the transistor current sources $Q_2$ connected in series with each of the short communications lines 5 from the remote alarm networks 6. The function of the gating pulse out of the decoder 28 is to ground the base of the transistor $Q_2$, during which time current $I_2$ will flow in the emitter circuit of the transistor $Q_2$ as determined by the nonlinear resistance networks at the remote station. An equal current $I_1$ will flow in the collector resistor $R_2$ and the resulting voltage developed across $R_2$ will be passed through a summation circuit 30 and provide as an input to the modulator or line driver 32. Intermediate the summation circuit 30 and the line driver 32 is a low pass filter 34 to isolate the transmitter from the communications channel 8.

One out of every 128 pulses from the B counter 26 is supplied by the decoder 28 to a second gated current source, transistor $Q_1$, which operates similarly to the transistor $Q_2$ to furnish current during a synchronized pulse interval to the resistor $R_2$ and produce a synchronized voltage which is then passed on to the summation circuit 30 and the the receiver 11.

If an alarm is present on the short communications link 5 from any remote station at state (M−3) from the A counter 22, a flip-flop memory cell 34 will be set and activate the inhibit circuit 24 to prevent further driver signals from being fed to the second counter 26. The flip-flop memory cell 34 will remain set until the receipt of a countering "clear" signal from the operator at the central monitoring station. As the inhibit is removed from the counter circuits, the continuous scanning will resume.

Figure 3:
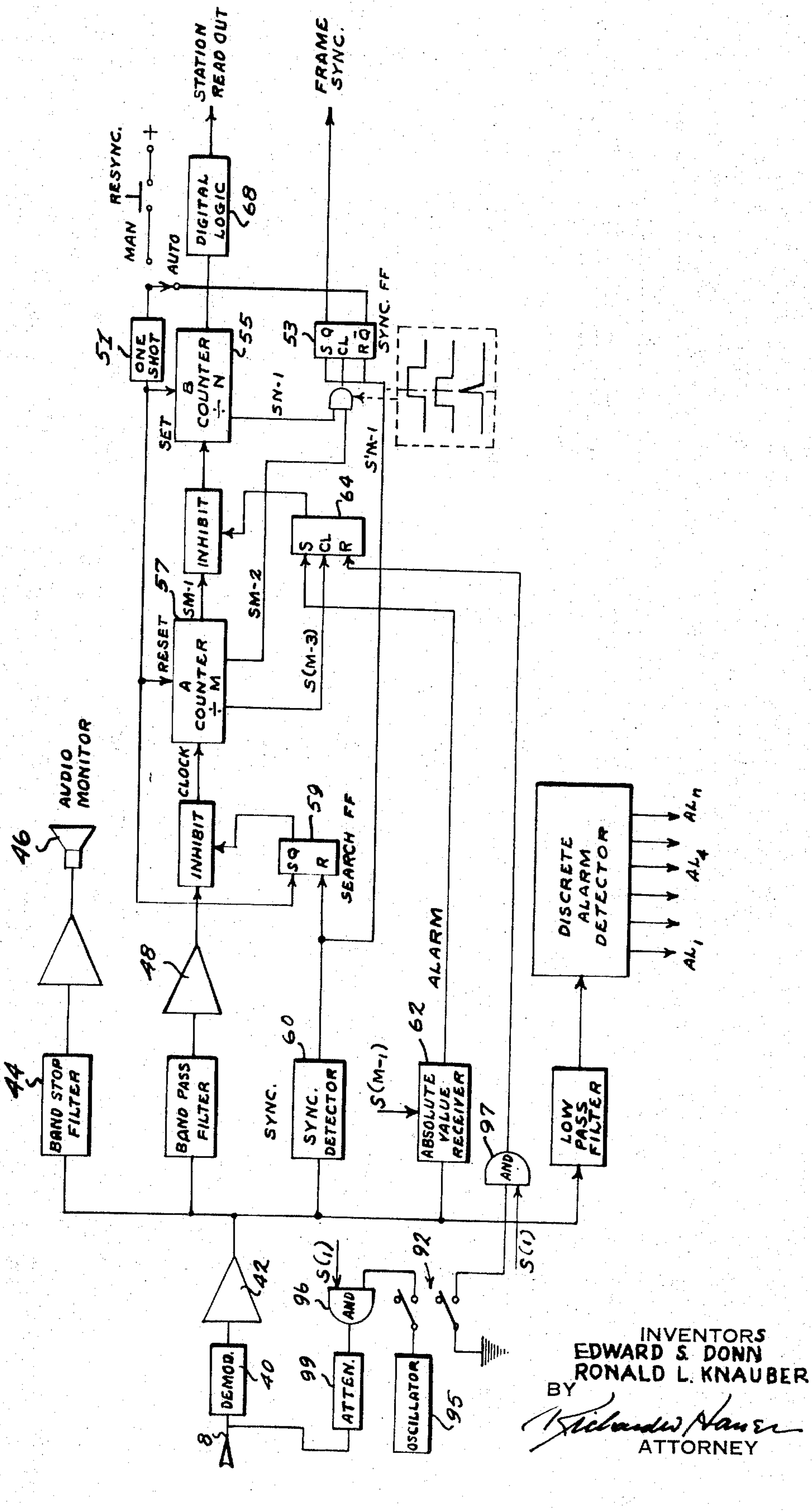
FIG. 3 is a block diagram of the multiplex receiver in the system of the present invention.

Referring now to the diagram of FIG. 3, the receiver is seen to comprise A and B counters with apparatus for synchronizing them with their counterpart counters of the transmitter, apparatus for detecting and identifying discrete alarm signals from remote stations and analog recovery means.

At the input of the receiver is a demodulator device 40 which separate the incoming intelligence from the transmitter carrier (assumming a modulated carrier system is used), which is followed by a linear variable gain amplifier 42. Information is extracted from the baseband signal by five detecting circuits.

A band stop filter 44 admits the alternating audio signals which are amplified and reproduced on a conventional speaker system 46. Video signals may also be received and displayed on this or a similar channel, provided video information is being presented as part of the analog compliment of signals.

A high gain band pass amplifier 48 extracts and passes the clock vestigal components inserted at the transmitter to provide means for synchronous operation of the transmitter and receiver. When the search one-shot multivibrator 51 is enabled by the synchronizing flip-flop 53, the B counter 55 is temporarily set to all "one" and the A counter 57 is set to all "zero" and the search flip-flop 59 is set to "one." The search flip-flop 59 thus inhibits the transmission of clock pulses from the amplifier 48 to the A counter 57 which prevents further operation of the A and B counters 57 and 55 until the synchronizing detector 60 receives a synchronizing pulse from the transmitter 4. When such a synchronizing pulse is received, the search flip-flop 59 is reset, removing the inhibit block and permitting the passage of clock pulses to the A counter 57. After the receipt of the synchronizing pulse, the A and B counters 57 and 55 will function in the same manner and cycle through the same states as their counterparts 22 and 26 in the transmitter 4. Since the B counter 26 in the transmitter represents the position of the "multiplex switch" or decoder 28, then the synchronized B counter 55 in the receiver 11 is utilized to indicate the address of the remote station being monitored at any instant in time.

In order to determine whether or not the signal being received from each remote station is within normal no-alarm limits or whether an alarm condition does exist, an "absolute value detector" circuit 62 is provided as an integral part of the multiplex receiver 11. The absolute value detector 62 examines, by a short time constant integration process, the energy level of three bands of interest, high, nominal or normal state. Upon the indication of a high or low "alarm" state, a binary "one" bit will be directed to the set input of the alarm flip-flop 64. Normal levels of signal energy will function to pass a binary "zero" bit to the alarm flip-flop 64. During the A counter state (M−3), the alarm flip-flop set input is gated to the memory of the flip-flop 64, and when a "one" or alarm signal is present at the set input of the flip-flop, an output from the flip-flop acts to inhibit the passage of clock pulses from the A to B counters 57 and 55. In the presence of an inhibit signal from the alarm flip-flop 64, a state of the art digital logic circuit 68 is employed to decode the B counter state and to drive binary or decimal read out lamps to indicate the address or location of the remote station in alarm condition.

Figure 5:
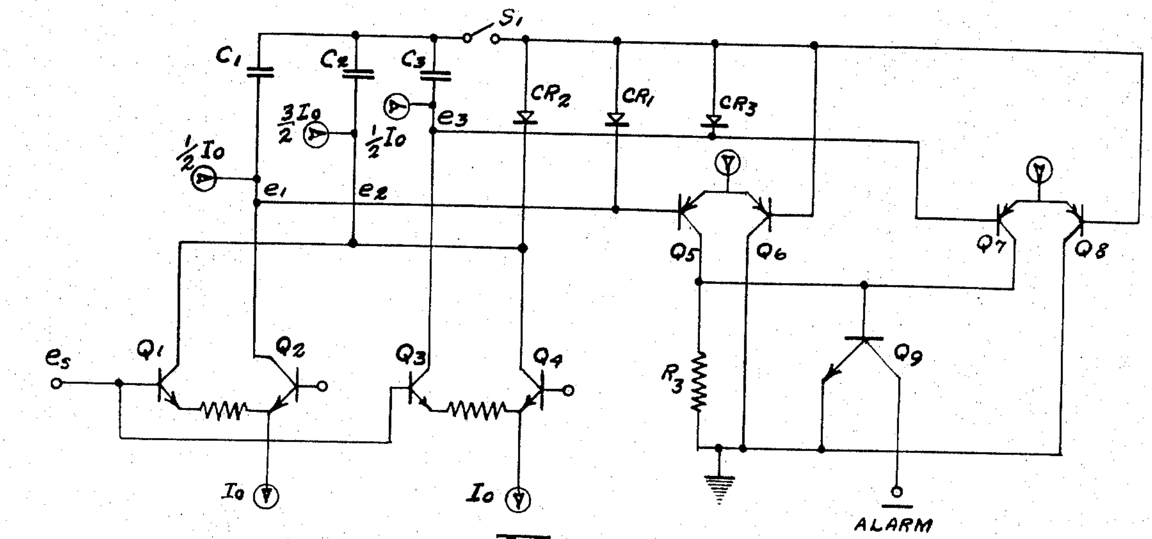
FIG. 5 is a circuit diagram of the ternary absolute value receiver which is depicted by a single block in FIG. 3.

The preferred form of circuit for detecting one of three possible signal levels is shown in FIG. 5.

Figures 6, 7:
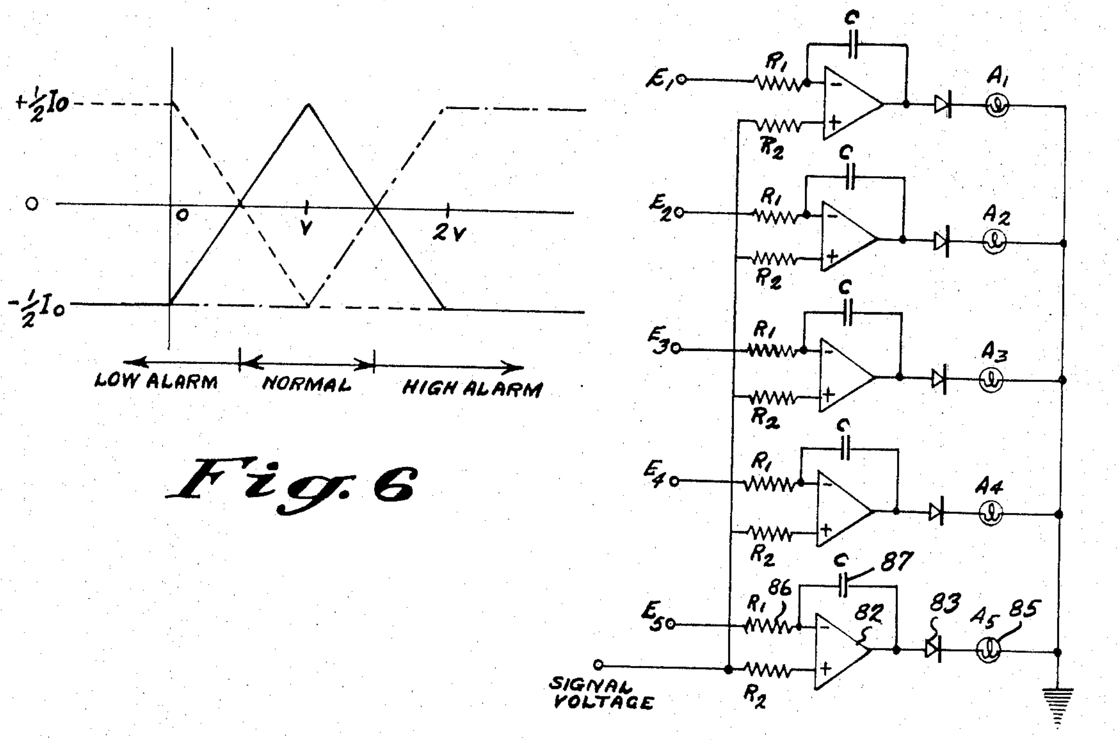
FIG. 6 is a graph of the discharge currents in the ternary absolute value receiver of FIG. 5.
FIG. 7 is a detailed block diagram of the discrete alarm detector in the receiver of FIG. 3.

The resultant current diagrams for the currents $I_1$, $I_2$, and $I_3$ are shown in FIG. 6. The absolute value operation is not carried out further than the interval 0 to 2V volts in the present system since it would convey no information.

The received signal voltage, $e_s$, is converted into a current for discharging three capacitors, $C_1$, $C_2$, and $C_3$, by two emitter coupled amplifiers which are comprised of transistors $Q_1$–$Q_4$. The rate at which the signal voltage is converted into a current is determined by the value of the resistors $R_1$ and $R_2$ which are both set equal to $V/I_0$. The bias on each amplifier is set at the base of transistors $Q_2$ and $Q_4$. This bias will determine the range of input voltage for which the amplifier will be active. Both amplifiers have an equal emitter bias current of $I_0$ amps. The capacitors each have a bias applied so that they may be charged in either direction, plus or minus. Circuits for generating constant bias currents with transistors are well known.

The most general circuit is that which charges and discharges the capacitor $C_2$. If the voltage $e_s$ is less than zero, transistors $Q_1$ and $Q_4$ will be full on. The current into $C_2$ will then be $-3/2I_0$ (bias)$+I$ (due to $Q_4$) or $-1/2I_0$. If the signal voltage is greater than 2 v., then $Q_1$ and $Q_3$ will be full on and $Q_2$ and $Q_4$ will be off. The current into $C_2$ will again be $-3/2I_0+I$ (due to $Q_1$) or $-1/2I_0$ as before. For intermediate values of voltage, both $Q_1$ and $Q_4$ will be on and the current will increase. The maximum value of current will occur when the voltage is equal to V in which case the discharge current will be $+1/2I_0$. When the voltage moves either way from V volts, either $Q_1$ or $Q_4$ will conduct less current. This is the absolute value feature.

Since absolute value is not necessary below zero or above 2 v. volts, the circuits for discharging $C_1$ and $C_3$ may be simplified. $C_1$ is discharged by only $Q_2$. When the input signal is slightly greater than zero, $Q_1$ will begin to conduct more current and $Q_2$ will conduct less current. Thus the discharge current into $C_1$ will decrease from a maximum of $1/2I_0$ when the input is equal to or less than zero to a minimum of $-1/2I_0$ when the input is equal to or greater than V. $C_3$ is discharged in a similar fashion by $Q_3$, but its range of operation is from V to 2V. The composite current waveform is shown in FIG. 6.

If, during the signalling interval, the average value of the signal was zero, $C_1$ will be most negative; if it was V, then $C_2$ will be most negative; and if it was 2V, then $C_3$ will be most negative. The most negative of the three voltages will pass through $CR_1$, $CR_2$ or $CR_3$ to the base of $Q_6$ and $Q_8$.

$CR_1$–$CR_3$ and $Q_5$–$Q_9$ detect which capacitor voltage is the most negative and thus determine which signal was sent: zero, V, or 2V. These three signals in the ternary alphabet of the present system correspond to low alarm, normal, and high alarm. If either a low or a high alarm was sent $C_1$ or $C_3$ will be most negative and this will turn on either $Q_5$ or $Q_7$ and $Q_9$. Whenever an alarm, either high or low was sent by a remote station $Q_9$ will be turned on.

At the end of the signalling interval, an electronic switch is closed to reset the voltage on all the capacitors to the same voltage or starting point.

High frequency signals and noise will be removed by the integrating process which discharges capacitors $C_1$–$C_3$. Low frequency perturbations will be removed by the current limiting process and the "least-of" detection process.

When an alarm condition is detected by the ternary absolute value detector 62 and the A counter pulses are inhibited from passing to the B counter in the receiver, the transmitter interrogations are also stopped by an alarm detector in the transmitter. Since the signal to noise ratio of incoming signals is higher at the transmitter than at the distant receiver, a less sophisticated method of detection is permissable at the transmitter. The signal output of the transmitter summation circuit 30 is conveyed to an alarm detector circuit which comprises a low pass filter or integrator 70 and two comparators 75 and 76 that are capable of being strobed or gated. The integrator circuit 70, including an operational amplifier 71 and a parallel connected capacitor 72, integrates the average value of the input signal during a B counter period. At the end of the B counter period, the charge on the integrator capacitor is dumped by an electronic switch 74 in parallel with the capacitor 72 so that integration of the next period can be started at a fixed reference level. The comparators are strobed by a (M—3) clock pulse just prior to the appearance of the (M—1) clock pulse which is employed to bias the transistor 74 and dump the capacitor 72. If the output of the integrator 70 is greater than V low reference, but less than V high reference, no output results. If the integrator output does not fall within these limits and is either higher or lower, an alarm condition exists and a signal output is passed through the "and" gate 78 to the "set" input of the transmitter alarm flip-flop 34 whereupon an inhibit signal restricts the transmission of A counter clock pulses to the B counter and the scanning of the remote stations is terminated.

The period of scan stoppage can be terminated automatically by a "clear" pulse generator, or the "clear" input to the reset of the flip-flop 34 or can be manually triggered by an operator through means well known to the art.

Once the transmitter and receiver have both been stopped from further scanning a direct communications link will have been established between the remote station which is in alarm and the central monitoring station. In this state, the discrete alarm detectors 81 within the multiplex receiver determine the mean level of the incoming signal by means of integration and the appropriate lamp or indicator connecter to the output of the integrating amplifier will be activated in order to give an indication of the type of alarm situation present at the remote station so that proper corrective action may be taken. Reference voltages $E_1$ and $E_5$ in figure corresponding to the expected alarm boundaries, are applied to the negative side of all alarm detecting operational amplifiers 82. When the signal voltage is greater than the reference voltage the amplifier will produce a positive voltage output which will pass through the diode 83 and light the corresponding series lamp 85. Resistor 86 and capacitor 87 at each amplifier 82 establish a time constant which slows down the detection operation so that it will not be perturbed by noise or high frequency analog signals which may be present along with the direct current signal voltage of interest.

As a further aid in applying corrections or taking action responsive to the alarm, concealed microphones, vibration detectors or video cameras provide low bandwidth analog information which is processed by well known means once the signal has passed through the band stop filter 44 in the receiver 11, which filter acts primarily to eliminate the vestigal clock from the analog information.

The "clear" signal is initiated by activation of a two-pole switch 92 which produces a "reset" input from an oscillator 95 to the alarm flip-flop 64 and thereby terminates the inhibit action on receiver scanning. The clear signals to the receiver and transmitter are timed through And gates 96 and 97 with an $S_1$ pulse from the A counter to maintain synchronization. The same switch also connects the oscillator 95 output to an attenuator 99 whose output is connected to the communications channel 8. At the transmitter, the oscillator's signal is routed through a bandpass filter 103 and to the input of a detector 104. If the "clear" signal is present, the detector output resets the alarm flip-flop circuit 34 in the transmitter, thus removing the inhibit signal from the transmitter clock pulse circuit.

The preferred form of the invention provides for the automatic generation of "clear" signals at such time as the transmitter scans a station which is in alarm and which alarm has been previously detected, responded to and cleared. Thus, such a station will not continuously stop the operation of the transmitter and receiver. To implement such a characteristic, the alarm flip-flop circuits are arranged so that the "reset" signal input overrides the "set" input.

A simplified, yet essentially similar, embodiment of this invention would consist of a combined unit comprising the basic circuitry of the transmitter and receiver but without the clock recovery and synchronization circuitry. This form of the invention would monitor a large number of events or processes as previously discussed, but the central monitoring station would be in closer proximity to the subscribers or monitored events.

We claim:

1. An electronic survelliance system comprising the combination:

- a monitor station comprising at least one receiver having alarm read out means;
- a combination time multiplexing and frequency multiplexing transmitter means disposed at a location remote from the monitor station;
- a plurality of monitored stations remote from said transmitter, each having active alarm detection and signal generating networks;
- a first communications link interconnecting the said transmitter and each of the remote monitored stations;
- a second communications link interconnecting the monitor station receiver and the said transmitter; and
- wherein said transmitter comprises:
  - means for sequentially sampling the signals being generated at the said monitored stations, and
  - means responsive to high or low signal values for detecting an alarm condition at a monitored station and terminating the said sampling scan.

2. The combination of claim 1 wherein the alarm detection and signal generating means comprise analog signal detection means, and a plurality of parallel dissimilar resistance elements and switch means in series with each resistance element.

3. The combination of claim 2 wherein the transmitter includes:

- clock pulse generating and dividing means for providing a plurality of gating pulses and a synchronizing pulse;
- electronic switch means interconnecting the said first and second communications links, said switch means being responsive to a particular one of said gating pulses; and
- means connecting the output of the clock pulse generating means to the said second communications link.

4. The combination of claim 3 and further including:

- integrator means;
- means connecting the transmitter output to the integrator means;
- a pair of comparator amplifiers having their inputs connected to the output of the integrator means;
- means directing a strobe signal from the pulse generating and dividing means to the said comparators to provide a time frame in which to sample the signals from the comparators;
- an alarm detector means connected to the output of the comparators; and
- means for inhibiting the output of the pulse generating and dividing means connected to the said alarm detector means.

5. The combination of claim 1 wherein the receiver includes:

- clock pulse amplifing and dividing means having an output;
- station address read out means connected to the output of the clock pulse dividing means;
- a synchronizing pulse detector;
- means inhibiting the operation of the clock pulse dividing means and responsive to the output of the synchronizing pulse detector.

6. The combination of claim 5 and further including demodulation and audio amplifier means for processing analog information.

7. The combination of claim 6 and further including:

- current value detector means having an output responsive to the coincidence of detector input current value and either one of two sets of current values;
- second receiver inhibit means including an alarm detector flip-flop circuit for inhibiting operation of the clock pulse dividing means; and
- means interconnecting the output of the current value detector means to the said second inhibit means.

8. The combination of claim 7 and further including:

- discrete alarm detector means having a plurality of outputs to identify discrete alarm conditions and wherein the said discrete alarm detector means is responsive to discrete signals existing on the said second communications link.

9. The combination of claim 8 and further including clearing means, including an oscillator, the output of said clearing means being connected to the reset input of the alarm detector flip-flop in the said second receiver inhibit means for re-enabling the operation of the clock pulse dividing means.

10. The combination of claim 2 and further including:

- clock pulse amplifying and dividing means having an output;
- station address read out means connected to the output of the clock pulse dividing means;
- a synchronizing pulse detector;
- means inhibiting the operation of the clock pulse dividing means and responsive to the output of the synchronizing pulse detector;
- demodulation and audio amplifier means for processing analog information;
- current value detector means having an output responsive to the coindence of detector input current value and either one of two sets of current values;
- second receiver inhibit means including an alarm detector flip-flop circuit for inhibiting operation of the clock pulse dividing means;
- means interconnecting the output of the current value detector means to the said second inhibit means;
- discrete alarm detector means having a plurality of outputs to identify discrete alarm conditions and wherein the said discrete alarm detector means is responsive to discrete signals existing on the said second communications link; and
- clearing means, including an oscillator, the output of said clearing means being connected to the reset input of the alarm detector flip-flop in the said second receiver inhibit means for re-enabling the operation of the clock pulse dividing means.

11. A method of detecting and recognizing discrete alarm values from a plurality of remote stations comprising the steps:

- generating at each of the remote stations a plurality of discrete electrical signals as a function of specific alarm conditions;
- sequentially sampling the existent signal at each remote station;
- identifying the signal as being within one of two sets of predetermined high and low signal limits;
- actuating alarm indicators and terminating further sampling upon coincidence of the existing signal value and the values with the said two sets of signal limits;
- analyzing the signal for determination and identification of discrete alarm conditions;
- generating at the remote station analog information relative to an alarm condition and transmitting the information to a receiving point.

12. The method of claim 11 and further including the step of resuming the sequential sampling after identification of the discrete alarm condition and receipt of the analog information.

13. The method of claim 12 wherein transmission of the multiple perimeter signal and the analog information signals are combined by means of the method of frequency multiplexing.

References Cited

UNITED STATES PATENTS

| | | | |
|---|---|---|---|
| 2,564,294 | 8/1951 | Belcher | 340—413 |
| 2,713,157 | 7/1955 | Collins | 34—413 |
| 2,393,021 | 1/1946 | Cheek | 179—15 B Y X |

| | | | |
|---|---|---|---|
| 3,217,306 | 11/1965 | Hillman | 340—181 |
| 2,696,604 | 12/1954 | Markow et al. | 340—181 X |
| 2,901,739 | 8/1959 | Freitas | 340—413 |
| 3,120,758 | 2/1964 | Craddock et al. | 340—212 X |
| 3,189,882 | 6/1965 | Ward | 340—413 |

DAVID L. TRAFTON, Primary Examiner

U.S. Cl. X.R.

179—15 AL, 15 BM; 340—181